No. 736,192. PATENTED AUG. 11, 1903.
T. W. BARBER.
STEERING MECHANISM FOR MOTOR VEHICLES.
APPLICATION FILED SEPT. 2, 1902.
NO MODEL
2 SHEETS—SHEET 1.
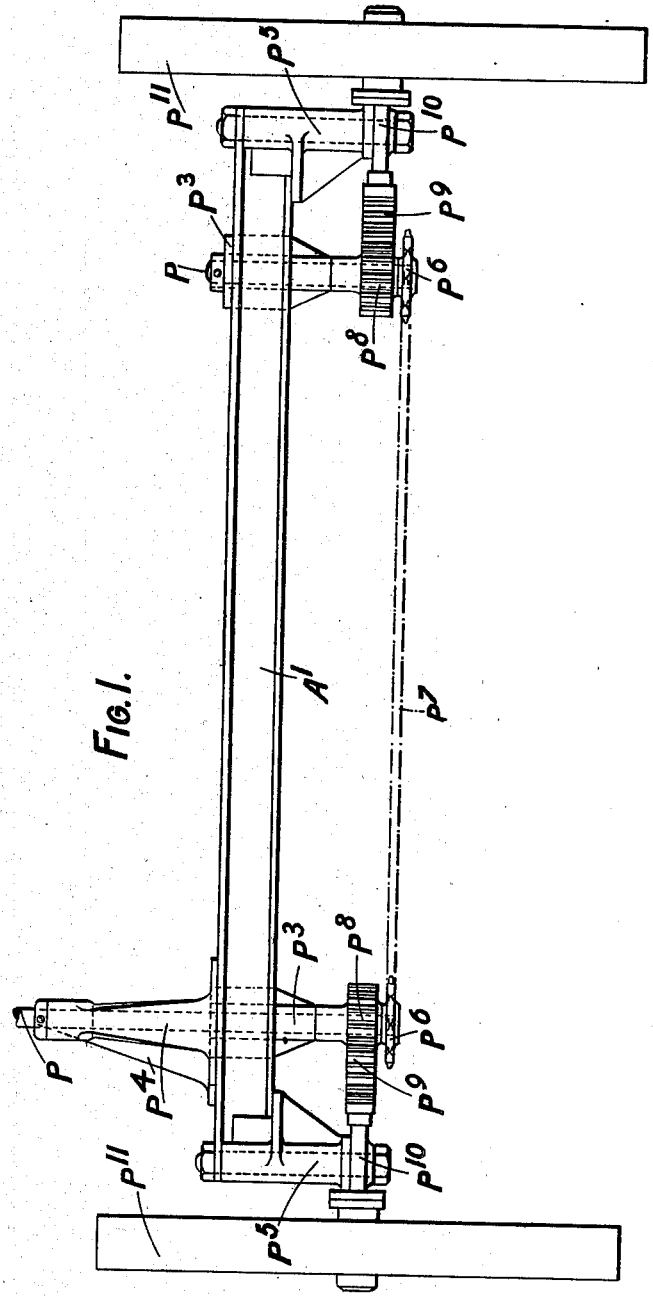

No. 736,192. PATENTED AUG. 11, 1903.
T. W. BARBER.
STEERING MECHANISM FOR MOTOR VEHICLES.
APPLICATION FILED SEPT. 2, 1902.
NO MODEL. 2 SHEETS—SHEET 2.
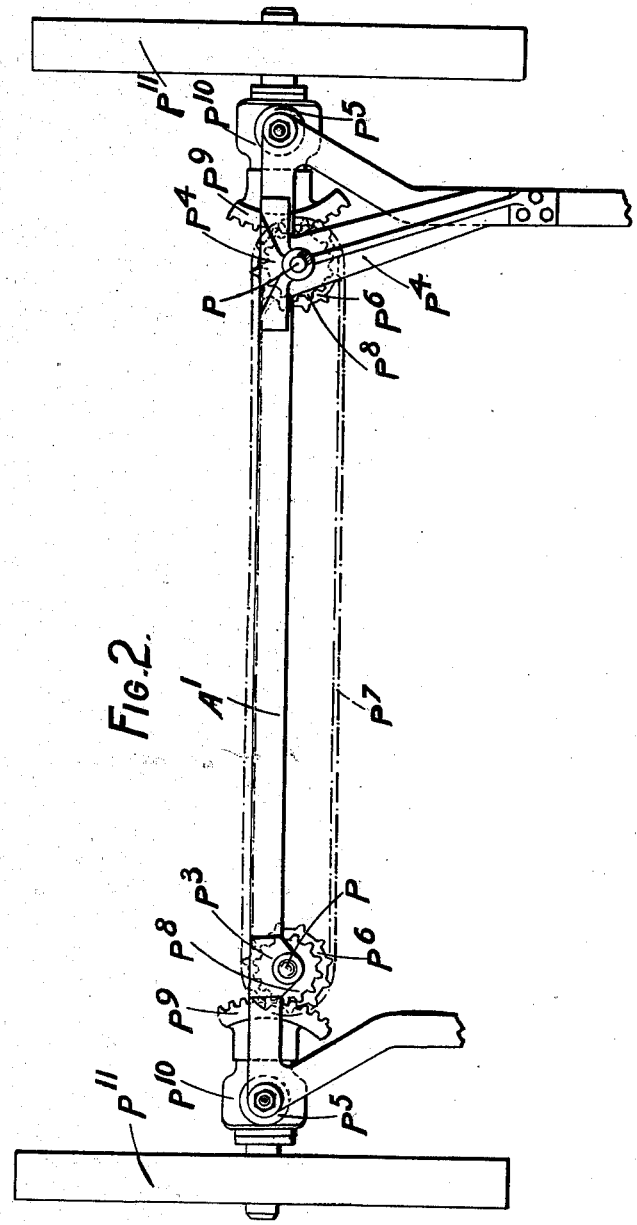

No. 736,192.

Patented August 11, 1903.

UNITED STATES PATENT OFFICE.

THOMAS W. BARBER, OF LONDON, ENGLAND.

STEERING MECHANISM FOR MOTOR-VEHICLES.

SPECIFICATION forming part of Letters Patent No. 736,192, dated August 11, 1903.

Application filed September 2, 1902. Serial No. 121,877. (No model.)

*To all whom it may concern:*

Be it known that I, THOMAS WALTER BARBER, a subject of the King of England, residing at London, England, have invented certain new and useful Improvements in Steering Mechanism for Motor Road-Vehicles, of which the following is a specification.

This invention relates to steering mechanism for motor road-vehicles, and has for its object to provide steering-gear of the Ackermann type, in which the short axles carrying the road-wheels are supported by improved means, whereby they are considerably strengthened. The short axles are also controlled by means which render them more controllable than the devices heretofore employed.

Steering-gear constructed according to this invention comprises a short axle for each of the road-wheels, each axle having a vertical pin free to turn in a socket rigidly secured to the main frame of the vehicle.

On that end of each axle remote from the road-wheel is mounted a toothed sector, each gearing with a pinion. One of the pinions is controlled by a hand-wheel and communicates movement to the second pinion by any convenient means, such as a chain gearing with sprocket-wheels secured to the pinions.

In the accompanying drawings, Figure 1 is an end elevation of part of the frame of a motor-vehicle with the steering mechanism attached constructed according to this invention, and Fig. 2 is a plan of the same.

Like letters indicate like parts throughout the drawings.

On each side of the frame of the vehicle, and if the latter is provided with a transverse member, such as $A'$, conveniently at the ends of this member, sockets or brackets $P^5$ are secured. Each socket $P^5$ receives a vertical pin P, secured by any convenient means to a short axle $P^{10}$. On that end of each axle remote from the socket by which it is carried is mounted a road-wheel $P^{11}$, and the opposite end of each axle is provided with a toothed sector $P^9$.

The sectors $P^9$ are made separately from the axles $P^{10}$ in order that the axles may be made of wrought material to give them increased strength, while the sectors may be cast to save expense. The sectors may afterward be permanently or detachably secured to their respective axles.

Gearing with the toothed sectors are pinions $P^8$, each carried by a vertical shaft free to rotate in a bracket $P^3$, secured to any convenient part of the vehicle-frame, and the shaft of one of the pinions, conveniently that on the right-hand side of the driver, is extended in an upward direction through a second bracket $P^4$ and may be provided with a hand-wheel or other device, by which it may be rotated.

Sprocket-wheels $P^6$ are secured to each of the pinions $P^8$, preferably on the under side, and these wheels are geared together by a chain $P^7$, so that movement of one pinion is transmitted to the other.

The advantage of this construction of steering mechanism is that the axles $P^{10}$, being carried in sockets rigidly secured to the frame of the vehicle, are held much more rigidly in place and adapted to withstand greater strains than when pivoted to a light axle in the usual manner.

Obviously the chain $P^7$ may be dispensed with, if desired, and the pinions $P^8$ made to coöperate by any other convenient means.

The road-wheels $P^{11}$ are mounted on their respective axles $P^8$ as close to the pins $P^3$ as possible, so that the load on each wheel falls on the axle at a point close to the wheel, thus relieving the axle of a considerable amount of unnecessary strain.

What I claim as my invention, and desire to secure by Letters Patent, is—

1. In steering mechanism for road-wheels, the combination of a transverse main frame member adapted to receive the load at its ends, opposite longitudinal main frame members secured by one end to opposite ends of the transverse member, a socket at each end of the frame member, a short axle pivotally mounted in the lower end of each socket, a road-wheel on each axle and a steering member operatively connected with both axles and disposed at a point between the sockets so as not to interfere with the disposition of the load immediately above the same, as set forth.

2. In steering mechanism for road-wheels, the combination of a transverse main frame member adapted to receive the load at its ends, opposed longitudinal main frame members secured by one end to opposite ends of the transverse member, sockets secured at each end of the transverse member, and also rigidly connected with the longitudinal members, a short axle pivotally mounted in the lower end of each socket, a road-wheel on each axle, and a steering member operatively connected with both axles and disposed at a point between the sockets so as not to interfere with the disposition of the load immediately above the same, substantially as set forth.

3. In steering mechanism for road-wheels, the combination of a transverse main frame member adapted to receive the load at its ends, a socket at each end of the frame member, a short axle pivotally mounted in the lower end of each socket, a road-wheel on each axle, toothed sectors rigidly secured to the free end of each axle, a separate pinion to gear with each sector, vertical spindles to carry each pinion, an extension to the spindle of one pinion situated to one side of the point at which the load rests upon the frame, a steering device secured to this extension, means for securing this pinion fast on its spindle, chain-wheels one operatively connected with each pinion and a chain connecting the two wheels so that the pinions move together for operating the steering-wheels as set forth.

In testimony whereof I have signed my name to this specification in the presence of two subscribing witnesses.

T. W. BARBER.

Witnesses:
 DAVID GUILLOD,
 A. M. HAYWARD.